Feb. 21, 1967 E. HARTLEB 3,304,947
APPARATUS FOR SUPPLYING GAS AT LOW PRESSURE
FROM A HIGH PRESSURE SOURCE
Filed March 19, 1965
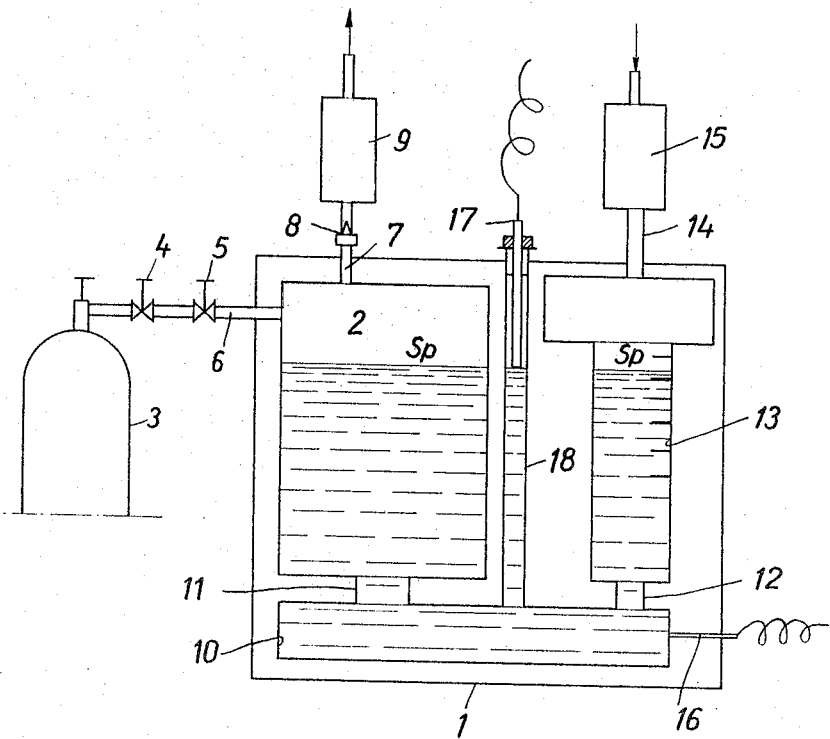
Inventor:
ERICH HARTLEB
by *Otto John Munz*
Attorney United States Patent Office
3,304,947
Patented Feb. 21, 1967

3,304,947
APPARATUS FOR SUPPLYING GAS AT LOW PRESSURE FROM A HIGH PRESSURE SOURCE
Erich Hartleb, Nievern, Kreis Bad Ems, Germany
Filed Mar. 19, 1965, Ser. No. 441,121
Claims priority, application Germany, Mar. 23, 1965, L 47,389
9 Claims. (Cl. 137—209)

The present invention generally relates to an apparatus for supplying gas at low pressure from a high pressure source.

Specifically the apparatus of the present invention has been designed for metering minute quantities of chlorine gas for ambulant water emergency units.

In ambulant drinking water emergency units or plants having a capacity to supply pure water at approximately 2,000 liters per hour, it is required to deliver a continuous uninterrupted supply of chlorine gas in metered quantities for treating the water.

To provide such a supply in times of catastrophies for the operation of such emergency units, in the absence of a line current may become extremely difficult and is impossible with the apparatuses of the prior art in view of the fact that the chlorine gas must be metered out in minute doses and no prior art devices are known, which are suitable for this purpose.

For an output of 2,000 liters of pure water per hour, approximately 2 grams of chlorine gas per hour (1 mg. per liter) are required, which is equal to 630 milliliters of chlorine gas per hour. Such a small amount of chlorine gas of about 10.5 milliliters per minute cannot be metered out even with a miniature type of the dosing devices used in the conventional water-works.

Using the known devices the amount of the dose also cannot be maintained constant because for ambulant drinking water emergency plants, small quantities of gas must be taken from steel bottles or steel cylinders charged with the same pressure which is employed in large dosing devices in the conventional waterworks.

As a result of its strong hygroscopic properties, chlorine gas attacks metals immediately on contact in the presence of the smallest amount of moisture and forms so-called oily condensation products which completely soil and clog after but a short period of time, the metering orifices or calibrated nozzles having a diameter of less than 0.1 mm., as they would have to be employed for dosing the abovementioned small quantities of chlorine gas.

The primary object of the present invention is to eliminate the deficiencies and drawbacks of the prior art.

Another object of the invention is to provide an apparatus of the type described for ambulant drinking water emergency units, equipped with a chlorine gas metering means which releases the chlorine gas from a gas tank in the required minute adjustable doses, keeping them constant.

Another object of the invention is to provide the apparatus of the type described equipped with means to supply the chlorine gas at low predetermined pressure from a high conventional pressure source in minute quantities without clogging the metering nozzle. Other objects and many of the advantages of the present invention will become obvious to those skilled in the art from the following disclosure taken in conjunction with the accompanying drawings and claims.

In the drawings the single figure is a partly schematic diagram and partly a vertical cross-sectional view of the apparatus of the present invention.

Broadly speaking the objects of the present invention are accomplished by providing in the unit an expansion chamber, which is connected with a cylinder having a graduated reading scale and which is closed off by a sealing liquid, which has a variable level as a result of a pressure medium which may be caused to influence that level. The chlorine gas is supplied from a conventional tank through a pressure reducing line.

The apparatus comprises a housing 1, equipped with an expansion chamber 2 for chlorine gas. The housing and all parts which come into contact with the gas are made of a material which is impervious to chlorine gas and to acids. Such materials are conventional in the art and may be for instance a plastic material. The gas is delivered from a chlorine gas supply tank 3 through conduit line 6, within which are interposed a coarse pressure reducing valve 4 and a fine-pressure reducing valve 5. The expansion chamber 2 has a connection to a discharge line 7 and delivers into it the chlorine gas after it has been expanded to a pre-determined low pressure. The expanded chlorine gas on its progress through the discharge line 7 passes through a metering nozzle 8 into a drinking water emergency unit, not shown.

In order to keep even the slightest amount of atmospheric moisture away from the chlorine gas, a drying apparatus 9 is provided in the discharge line 7 behind the metering orifice 8 in the direction of flow, and the expansion chamber 8 is sealed off with respect to a device indicating the expansion pressure by means of a sealing liquid. For receiving the sealing liquid, a container 10 is provided in the bottom of the housing 1, which is in an open connection 14 with the atmosphere and with the expansion chamber 2 by means of a flanged pipe socket 11 and with the pressure-indicating device by means of a flanged pipe socket 12.

The means for indicating a slight excess pressure of chlorine gas is for example, a 50–100 mm. water column in the expansion chamber 2. It has a cylinder 13 of transparent material with a scale for reading the level Sp (specific weight) of the sealing liquid which corresponds to the respectively resired excess pressure in the expansion chamber 2. The adjustment is effected by means of the precision regulating valve 5 for the chlorine gas which is brought into the expansion chamber 2 through a line 6 and is caused to act upon the sealing liquid which is present therein. The line 14 is also provided with a drying apparatus 15 which eliminates moisture. The smaller the specific weight is of the sealing liquid, the smaller will be the excess pressure within the indicating area of the cylinder 13.

Sulphuric acid, which is not decomposed by chlorine and which has a concentration so high that its hygroscopic properties surpass those of the chlorine gas, is used as the sealing liquid.

Furthermore, sulphuric acid has an electrical conductivity which makes it possible to control the metering apparatus electrically.

For this purpose, a stationary contact 16 and a movable contact 17 project into the sealing liquid. For the latter contact, a pipe 18 is provided which communicates with the expansion chamber 2 and with the cylinder 13. The two contacts 16 and 17 close the alternating current of a control device (not shown) by way of the measuring liquid.

The movable contact 17 is adjusted in such a manner that it is barely immersed after the regulation or adjustment of the level Sp of the sealing liquid in the expansion chamber which corresponds to the desired excess pressure in the expansion chamber 2. As a result thereof, the raw water side of a drinking water emergency unit will immediately and automatically be separated from the pure water side by means of the adjustment of the movable contact 17 should any deviations occur in the level

I claim:

1. An apparatus for supplying gas at low pressure from a high pressure source comprising spaced chambers, a conduit connecting said chambers, and a liquid in said chambers and conduit; means for supplying gas under predetermined pressure to one of said chambers above the liquid therein, a conduit leading from said one chamber above the level of the liquid therein for conducting the gas from said one chamber and a conduit connecting the other chamber above the liquid therein to atmosphere, said other chamber being of a transparent material and having index marks thereon whereby to indicate the pressure of the gas in the first chamber by indicating the level of the liquid in the second chamber.

2. A device as defined in claim 1 wherein the means for supplying the gas under predetermined pressure comprises a conduit connected to a high pressure source of gas and a coarse pressure reducing valve and a fine pressure reducing valve in series in said conduit.

3. A device as defined in claim 1 further including a drying device in the conduit leading from said one chamber and a drying device in the conduit connecting the other chamber to atmosphere whereby to absorb moisture.

4. A device as defined in claim 1 wherein the liquid is concentrated sulphuric acid.

5. A device as defined in claim 1 further including a pair of spaced contacts, one of said contacts being adjustable relative to the level of the liquid, and an electric circuit connected to said contacts, said circuit being completed upon contact of the liquid with said adjustable contact.

6. A device as defined in claim 1 further including a contact supporting conduit connected to the conduit connecting the chambers and extending above the level of the liquid in the chambers, a contact supported by the supporting conduit, means for adjusting the contact relative to the level of the liquid, and a fixed contact supported beneath the level of the liquid.

7. An apparatus for metering minute quantities of chlorine gas for ambulant drinking water emergency plants, comprising a housing 1, within said housing an expansion chamber 2 for chlorine gas, a chlorine gas pressurized supply tank 3, a pressure reducing conduit line 6 connecting said tank with said expansion chamber, a cylinder 13 provided with a graduated reading scale communicating with said expansion chamber and means to close off said expansion chamber from said cylinder by a sealing liquid, having a level variable by means of a fine-adjusting valve 5.

8. An apparatus as claimed in claim 7 said sealing liquid being highly concentrated conductive sulphuric acid, stationary and movable electric contacts 16, 17, an alternating current circuit electric control device, said contacts positioned to close by a predetermined level of said sealing liquid.

9. An apparatus as claimed in claim 7 and drying apparatuses 9, 15 one connected to dry the chlorine gas discharge line 7 and the other the atmospheric pressure supply line 14.

References Cited by the Examiner

UNITED STATES PATENTS

| | | | |
|---|---|---|---|
| 1,605,020 | 11/1926 | Woodbridge | 200—81.6 X |
| 1,916,427 | 7/1933 | Korver | 200—81.6 |
| 2,169,088 | 8/1939 | Carter | 200—81.6 X |
| 2,355,975 | 8/1944 | Henrici. | |
| 2,536,089 | 1/1951 | Ratchford et al. | 200—81.6 |

M. CARY NELSON, *Primary Examiner.*

H. T. KLINKSIEK, *Assistant Examiner.*